May 13, 1941.  J. W. DAWSON ET AL  2,241,808
CONTROL APPARATUS
Filed March 31, 1938   3 Sheets-Sheet 3

WITNESSES:

INVENTORS
John W. Dawson and
William R. Wickerham.
BY
Paul E. Friedemann
ATTORNEY Patented May 13, 1941

2,241,808

UNITED STATES PATENT OFFICE 2,241,808

CONTROL APPARATUS

John W. Dawson, Turtle Creek, and William R. Wickerham, Swissvale, Pa., assignors to Westinghouse Electric & Manufacturing Company, East Pittsburgh, Pa., a corporation of Pennsylvania Application March 31, 1938, Serial No. 199,178

8 Claims. (Cl. 172—289)

Our invention relates to motor starters and more particularly to systems for automatically starting synchronous motors.

Efforts have heretofore been made to start synchronous motors automatically in response to field frequency and attempts have also been made to secure maximum pull-in torque for a synchronous motor at synchronization by means of stroboscopic means, but so far as we are aware, no one has heretofore solved the problem of maximum pull-in torque synchronization of synchronous motors by the use of electronic means which in themselves, in coaction with suitable additional electric devices, select the moment of energization of the field winding to secure maximum pull-in torque at synchronization.

One object of our invention is to provide for maximum pull-in torque of a synchronous motor by the use of electronic means.

A more specific object of our invention is to cause the energization of the field winding of a synchronous motor in response to electronic means jointly responsive to the alternating current in the stator and the rotor.

A further object of our invention is the provision of electric means, responsive to two different electric characteristics of a synchronous motor, adapted to provide for synchronization of the motor so as to have maximum pull-in torque.

Other objects and advantages will become more apparent from a study of the following specification and the accompanying drawings, in which.

Figure 1:
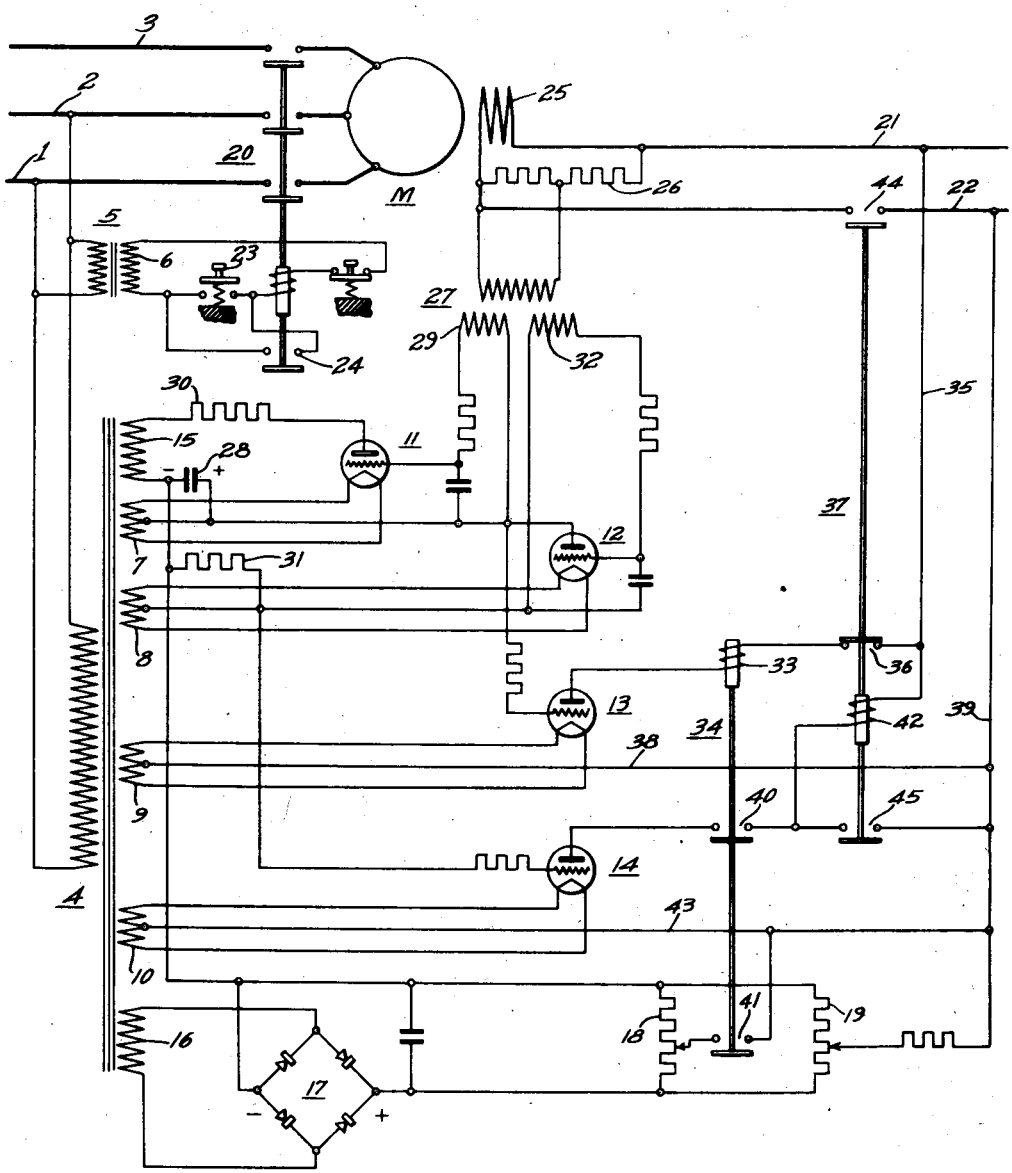
Figure 1 is a diagrammatic showing of a starting control using the field frequency as one current characteristic and the frequency of the current in the stator as another characteristic to aid in the starting control of a synchronous motor.

In Figure 1 we show a synchronous motor M having the field winding 25 provided with the discharge resistor 26. A transformer 27 is interconnected with the discharge resistor 26 and by means of a pair of oppositely connected secondary windings 29 and 32 controls the biases of the grids of a pair of electronic devices, as tubes 11 and 12.

Connected to the supply buses are a pair of transformers 4 and 5. Transformer 5 supplies electric energy to the stator energizing control circuit, whereas transformer 4, supplying energy to several resistors, as 18, 19, 30 and 31, four tubes 11, 12, 13 and 14, several condensers of which condenser 28 is the more important, and a rectifier 17, helps control the synchronization of the synchronous motor.

The arrangement is such that condenser 28 is charged more and more as the motor accelerates. At somewhere near synchronism the charge is sufficiently high that tube 13, one of the two tubes 13 and 14, interconnected with both the direct-current buses and the alternating-current supply, breaks down. Tube 14 is energized through the operation of the control contactor 34 which operation is caused by the breakdown of tube 13. At a given point of an alternating-current cycle in the field winding 25, tube 14 breaks down, with the result that the field contactor energizes the field winding when a given point on a given pole piece has a given position with reference to the rotating field in the stator.

A better understanding can be had from a more detailed discussion.

If conductors or buses 1, 2 and 3 are connected to a suitable source of alternating current by a circuit breaker, not shown, then transformers 4 and 5 will be energized. The secondary 6 of transformer 5 supplies a control circuit for energizing the stator of the motor M. Secondary windings 7, 8, 9 and 10 energize the filaments, or cathodes of the tubes, or thermionic devices 11, 12, 13 and 14. The tubes are thus in heated condition before the motor M is energized.

Secondary winding 15 provides suitable potential across the principal electrodes of tubes 11 and 12, whereas secondary 16 supplies energy to the full-wave rectifier. This rectifier in turn supplies electric energy of suitable potential and of correct polarity across resistors 18 and 19.

To get a full understanding of my invention a typical starting cycle with reference to Fig. 1 will first be described. Assuming the transformers 4 and 5 and thus the control circuit for the starting switch 20, the tubes 11, 12, 13 and 14 and the rectifier are energized, and the direct-current buses 21 and 22 are also energized, and the attendant wishes to start the motor M, then the starting push button switch 23 is actuated and a circuit is established for the actuating coil of the main starting switch 20. This starting switch 20 operates to connect the motor M to the buses 1, 2 and 3 and also operates a contact member 24 to maintain its own energizing circuit.

The motor thus starts to operate as an induction motor. In thus operating as an induction motor, an alternating current is induced in the field winding 25 having at each instant during the acceleration a frequency proportional to slip. This current traverses the discharge resistor 26 and by the connection shown energizes the transformer 27. At the instant after the starting switch 20 has operated, the frequency of the currents supplied by the secondaries of the transformer 27 will be equal to the frequency of the supply buses 1, 2 and 3, but as the speed of motor M increases, the grid biases on each of the grids of tubes 11 and 12 will change less and less frequently.

Since the tube 11 acts as a rectifier, the condenser 28 will be charged more and more the longer the charge is permitted to build up. As long as the frequency of the potential supplied by secondary 29 is high, the condenser 28 will not become excessively charged, but with less and less slip, more and more charging impulses from the secondary 15 act to charge condenser 28.

Resistor 30, being of high resistance value, limits the charge on condenser 28 per impulse. Resistor 31 on the other hand, being of low resistance value, thus permits substantially instantaneous discharging of the condenser at each reversal of field current. The discharge circuit for the condenser 28 may be traced from the right hand terminal of the condenser through the anode of tube 12, the cathode of tube 12, and through resistor 31 to the left-hand terminal of the condenser.

It will be noted that the secondary 32 of transformer 27 is connected to the grid of tube 12 in an opposite sense to the connection of the secondary 29 to the grid of tube 11. This means, with the connections made as shown, that tube 12 will be caused to break down at a given instant during the time a certain polarity exists across specified terminals of the field winding 25. The way the connections are made, tube 12 actually breaks down at the end of a positive cycle across the field 25.

As the speed of the motor becomes higher and higher, the slip frequency becomes lower and lower with the result that the discharge voltage of condenser 28 across the resistor 31 becomes higher and higher. When the motor is somewhere near synchronous speed, the bias on the grid of tube 13 is changed in positive sense sufficiently to cause this tube to break down. Tube 13, being controlled by the amount of charge of condenser 28 is caused to break down when this charge becomes sufficiently high due to low slip as previously explained.

When tube 13 breaks down a current conducting circuit is established for coil 33 of the control contactor 34. This circuit may be traced from the positive bus 21 through conductor 35, switch 36 of field contactor 37, coil 33, the principal electrodes of tube 13, and conductors 38 and 39 to the negative bus 22.

Operation of control contactor 34 causes the closing of switches 40 and 41 to thus connect the principal electrodes of tube 14 to the buses 21 and 22.

The potential of resistor 31, as modified by the grid biasing control comprising the circuit from conductor 43, contact members 41, a portion of potentiometer resistor 18, the resistor 31 to the grid of tube 14, is thus impressed on the grid of tube 14 and this tube 14 breaks down at the end of a positive cycle across the field 25.

When tube 14 breaks down a current conducting circuit is established for the coil 42 of field contactor 37. The circuit for this coil 42 may be traced from the positive bus 21, through conductor 35, coil 42, switch 40, the principal electrodes of tube 14 and conductors 43 and 39 to negative bus 22. The secondary 16, the rectifier 17 and the resistors 18 and 19 are merely grid biasing control means for the grids of tubes 13 and 14. By a suitable adjustment of the adjustable leads on resistors 18 and 19, respectively, the breakdown of these tubes may be controlled. Since the instantaneous position of the voltage supplied from the rectifier 17 to the grid of tube 14 is a function of the position of the rotating field in the stator and since the change in potential across resistor 31 is a function of the rotor position, it is clear that tube 14 breaks down, if desired, at such a time that the motor pulls into synchronism at maximum pull-in torque.

By selecting the proper inductive time constant for the field contactor in relation to the characteristics of the field 25 and other units of our system of control, the field 25 is caused to be energized when the pole pieces upon which the fields are wound hold a given position in relation to a given point on a wave of alternating current supplied to the stator of the motor. The motor may thus be synchronized to have maximum pull-in torque.

Operation of the field contactor 37 causes the closing of field switch 44 and the field contactor also establishes a holding circuit for itself through switch 45.

Since switch 36 is opened by the field contactor, tube 13 is deenergized and coil 33 releases the control contactor to open switches 40 and 41. Tubes 13 and 14 are thus deenergized, and since the frequency also disappears at the transformer 27, tubes 11 and 12 are extinguished. The motor thus runs at synchronous speed.

Figure 2:
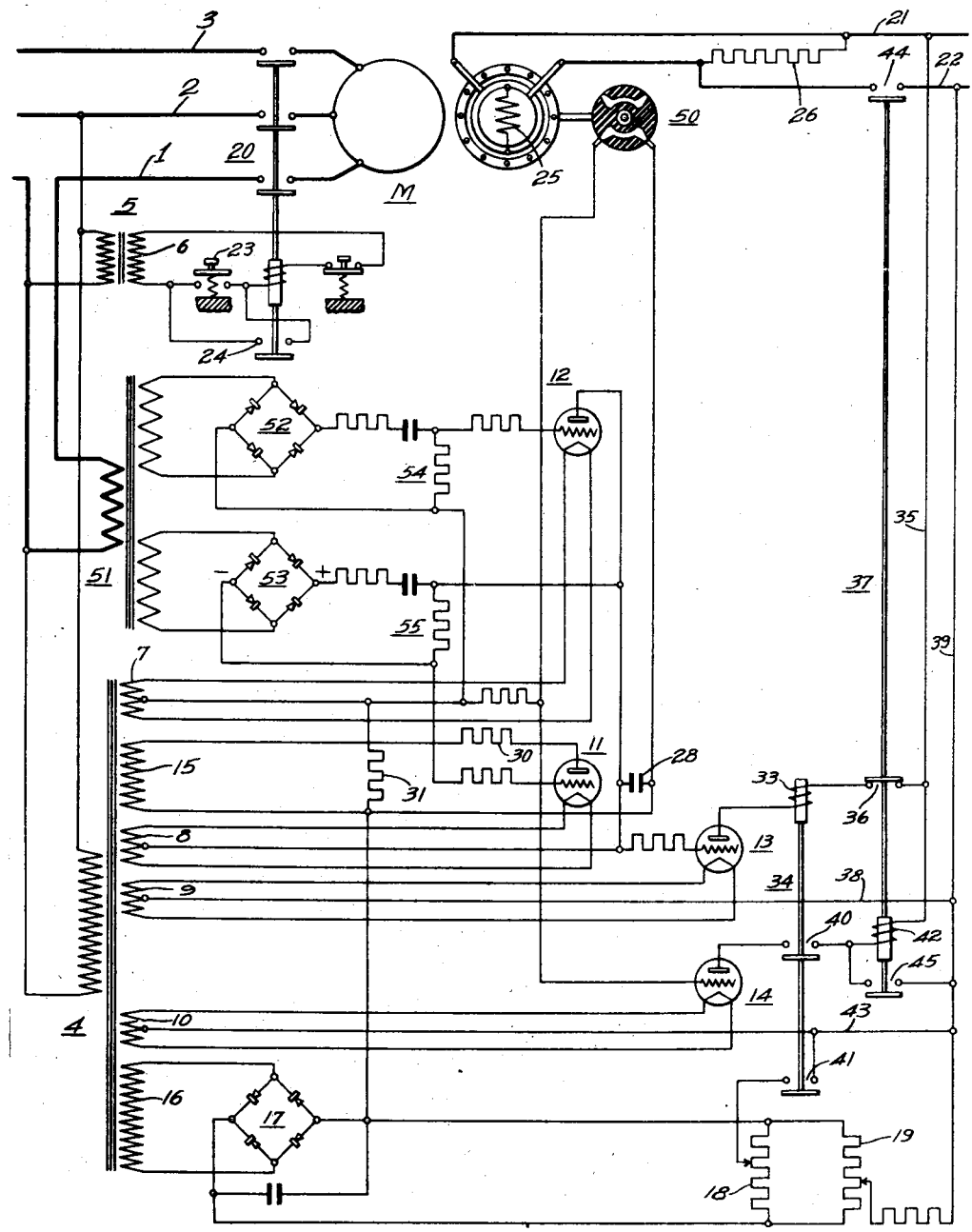
Fig. 2 is a diagrammatic showing of a modification of our invention utilizing two characteristics of the stator circuit of a synchronous motor to control the starting of the motor.

In the modification shown in Fig. 2, the operation of all the elements numbered like the elements shown in Fig. 1 is exactly like the same elements shown in Fig. 1. However, the control is not now responsive to an electrical condition of the field winding. To get the same result accomplished by the embodiment illustrated in Fig. 1, we use a rotary circuit interrupter 50 and a current transformer supplying current to a pair of full-wave rectifiers 52 and 53.

The filtering circuits 54 and 55, and the rectifiers 52 and 53 produce an energization of tubes 11 and 13 in response to the envelope of the armature or stator current of the motor. Since the frequency of this envelope current is directly proportional to the slip, tubes 11 and 12 are energized and controlled like the control impressed on tubes 11 and 12 by the secondary windings 29 and 32 shown in Fig. 1.

To make certain that tube 14 breaks down exactly when the pole pieces hold a given position in space, the rotary circuit interrupter 50 is used. The contact strips of the circuit interrupter hold a given position to the pole pieces with the result that tube 14 becomes conducting only when the field windings and the rotary field in the stator hold a given position relative to each other.

Figure 3:
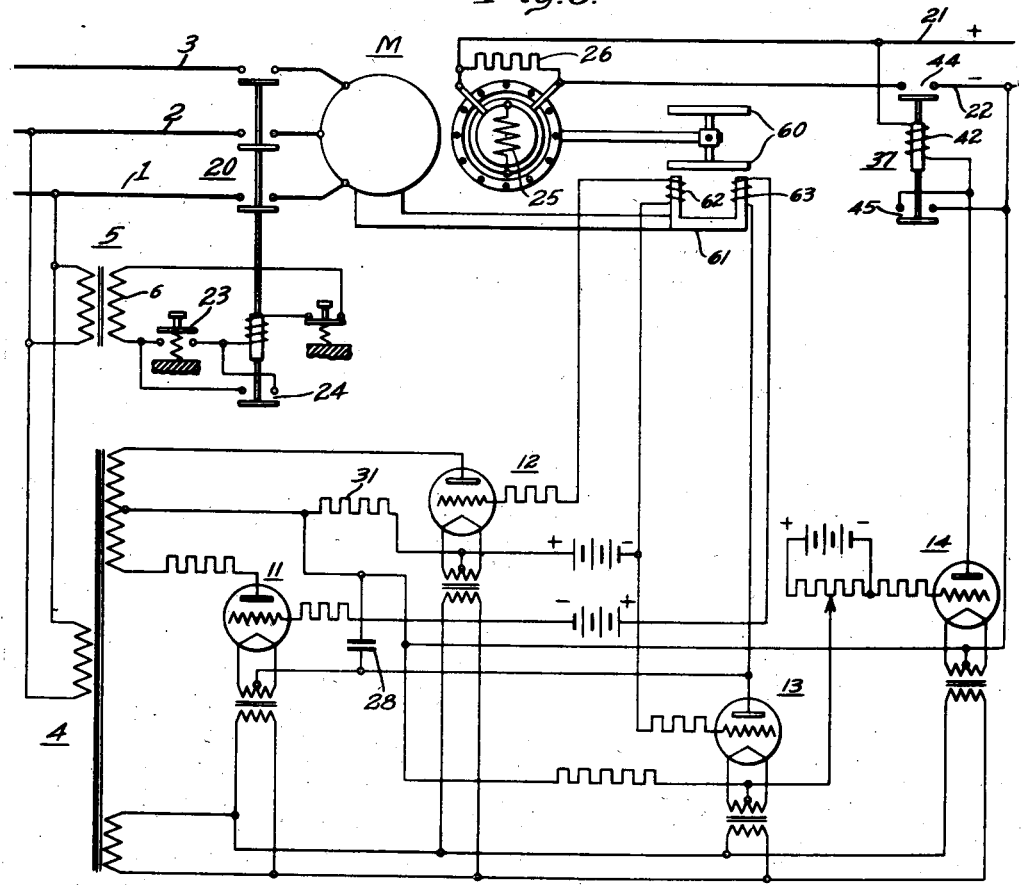
Fig. 3 is a diagrammatic showing of still another modification of our invention.

In the modification shown in Fig. 3, the end of the motor shaft is provided with a plurality of angularly adjustable para-magnetic strips 60, one for each pair of poles, which are disposed to coact with a permanent magnet 61. The permanent magnet carries a pair of coils 62 and 63. The batteries shown produce the necessary permanent biases. Each time the pole pieces of the motor are in a given position, the biases on the grids of each of the tubes 11, 12 and 13 are changed. The result is that the tubes 11, 12, 13 and 14 control the field contactor 37 in the manner field contactor 37 is controlled in Figs. 1 and 2.

Figure 4:
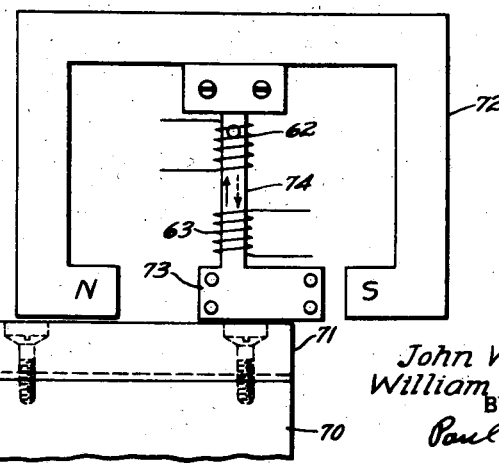
Fig. 4 is a schematic showing of an impulse generator for giving an especially sharp impulse of electric energy.

In the showing of Fig. 4, 70 represents the synchronous motor shaft. A soft iron strip 71 is secured to this shaft in adjustable manner. A permanent magnet 72 is mounted in fixed relation to the shaft 70. The permanent magnet may be bolted or otherwise connected to the stator frame of the synchronous motor.

Soft iron laminations 73, having regions of small sectional area as at 74, are connected to the magnet as shown. The air gap at the south pole of the magnet is small and at the north pole is large, as shown, so that normally the flux in the region 74 will be of a given value and will be down or in the direction indicated by the dotted line arrow. When the soft-iron strip 71 moves adjacent the laminations 73 and the north pole the effective air gap at the north pole becomes very much less than at the south pole. The result is that the flux in region 74 is very rapidly reversed to a degree of saturation. The flux in strip 74 is thus temporarily in the direction indicated by the full line arrow. Very sharp non-reversing voltage impulses are thus induced in windings 62 and 63 each time strip 71 moves to the position shown. These voltage impulses may very effectively be used for control purposes with the circuit arrangements shown in Figs. 1, 2 and 3. In fact the type of impulse generator shown in Fig. 4 is more effective and positive and is thus preferred over the types of control shown with the showings in Figs. 1, 2 and 3.

We have shown only three systems for accomplishing synchronization of the synchronous motors, but we are aware that others skilled in the art, particularly after having had the benefit of our teachings, could devise other circuit arrangements for accomplishing the same result. We, therefore, wish to be limited only by the pertinent prior art and the claims hereto appended.

We claim as our invention:

1. In a system of control for starting a synchronous motor, in combination, a synchronous motor having an armature winding, a field winding, a damper winding constituting a starting means to start the motor as an induction motor upon energization of the armature by alternating current, a source of alternating current, means for connecting the armature to the source of alternating current, a source of direct current, switching means for connecting the field winding to the source of direct current, and control means, adapted to cause the operation of said switching means, said control means including electronic means responsive to the frequency of the envelope current in the armature winding, other electronic means responsive to the frequency of the current in the armature winding, and still other electronic means responsive to the combined effect of the first two electronic means adapted to control the operation of said switching means for connecting the field winding to the source of direct current.

2. In a system of control for starting a synchronous motor, in combination, a synchronous motor having an armature winding, a field winding, a damper winding constituting a starting means to start the motor as an induction motor upon energization of the armature by alternating current, a source of alternating current, means for connecting the armature to the source of alternating current, a source of direct current, switching means for connecting the field winding to the source of direct current, and control means, adapted to cause the operation of said switching means, said control means including electronic means responsive to the frequency of the envelope current in the armature winding, other electronic means responsive to the frequency of the current in the armature winding, and still other electronic means operable by said first two electronic means at an instant when a given point on the wave of alternating current supplied to the armature winding and a given point on a wave of the envelope current in the armature winding hold a given phase position with reference to each other, adapted to control the operation of said switching means for connecting the field winding to the source of direct current.

3. In a system of control for starting a synchronous motor, in combination, a synchronous motor having an armature winding, a field winding, a damper winding constituting a starting means to start the motor as an induction motor upon energization of the armature by alternating current, a source of alternating current, means for connecting the armature to the source of alternating current, an independent source of direct current, switching means for connecting the field winding to the said independent source of direct current, and control means, adapted to cause the operation of said switching means, said control means including electronic means responsive to the frequency of the current in the field winding, other electronic means responsive to the frequency of the current in the armature winding and still other electronic means responsive to the combined effect of the first two electronic means adapted to control the operation of said switching means for connecting the field winding to the said independent source of direct current at an instant when the field winding has a given position to the rotating flux in the armature winding.

4. In a system of control for starting a synchronous motor, in combination, a synchronous motor having an armature winding, a field winding, a damper winding constituting a starting means to start the motor as an induction motor upon energization of the armature by alternating current, a source of alternating current, means for connecting the armature to the source of alternating current, an independent source of direct current, switching means for connecting the field winding to the source of direct current, and control means, adapted to cause the operation of said switching means, said control means including electronic means responsive to the frequency of the current in the field winding, other electronic means responsive to the frequency of the current in the armature winding and still other electronic means operable by said first two electronic means at an instant when a given point on the wave of alternating current supplied to the armature winding and a given point on the wave of alternating current and field winding hold a given phase position to each other, adapted to control the operation of said switching means for connecting the field winding to the source of direct current.

5. In a system of control for starting a synchronous motor, in combination, a synchronous motor having an armature winding, a field winding, a damper winding constituting a starting means to start the motor as an induction motor upon energization of the armature by alternating current, a source of alternating current, means for connecting the armature to the source of alternating current, a source of direct current, switching means for connecting the field winding to the source of direct current, and control means, adapted to cause the operation of said switching means, said control means including a first electronic means and a second electronic means, an impulse generator adapted to generate sharp voltage impulses each time the pole pieces of the motor hold a given position in space, said first named electronic means being responsive to the frequency of the current in the armature winding and the second electronic means being responsive to the voltage impulses of the impulse generator, still other electronic means responsive to the combined effect of the first two electronic means adapted to control the operation of said switching means for connecting the field winding to the source of direct current.

6. In a system of control for starting a synchronous motor, in combination, a synchronous motor having an armature winding, a field winding, a damper winding constituting a starting means to start the motor as an induction motor upon energization of the armature by alternating current, a source of alternating current, means for connecting the armature to the source of alternating current, a source of direct current, switching means for connecting the field winding to the source of direct current, and control means, adapted to cause the operation of said switching means, said control means including a first electronic means and a second electronic means, an impulse generator coupled to the rotating element of the motor and adapted to generate sharp voltage impulses each time a given point on the pole pieces for the field winding holds a given position in space, said first named electronic means being responsive to the frequency of the current in the armature winding and the second electronic means being responsive to the sharp voltage impulses generated by said impulse generator, and still other electronic means operable by said first two electronic means at an instant when a given point on the wave of the alternating current supplied to the armature winding and the sharp voltage impulse generated by the impulse generator hold a given phase position with reference to each other adapted to control the operation of said switching means for connecting the field winding to the source of direct current.

7. In a system of control for starting a synchronous motor, in combination, a synchronous motor having an armature winding, a field winding, a damper winding constituting a starting means to start the motor as an induction motor upon energization of the armature by alternating current, a source of alternating current, means for connecting the armature to the source of alternating current, an independent source of direct current, field circuit switching means for connecting the field winding to the said independent source of direct current, and control means including electronic discharge means adapted to operate at a given asynchronous speed of the motor, control switching means operated by the operation of said electronic discharge means, an electronic discharge device having a pair of principal electrodes connected to be energized by the operation of said control switching means, said electronic discharge device having a control electrode connected to be simultaneously energized from the source of alternating current and the slip current induced in the field winding, the potential adjustments of the control electrodes being such that the electronic discharge device breaks down only at an instant when the field winding holds a given position with reference to the flux in the stator, and means responsive to the breakdown of said electronic discharge device for operating said field circuit switching means.

8. In a system of control for starting a synchronous motor, in combination, a synchronous motor having an armature winding, a field winding, a damper winding constituting a starting means to start the motor as an induction motor upon energization of the armature by alternating current, a source of alternating current, means for connecting the armature to the source of alternating current, an independent source of direct current, field circuit switching means for connecting the field winding to the said independent source of direct current, and control means including electronic discharge means adapted to operate at a given asynchronous speed of the motor, control switching means operated by the operation of said electronic discharge means, an electronic discharge device having a pair of principal electrodes connected to be energized by the operation of said control switching means, said electronic discharge device having a control electrode connected to be simultaneously energized as a function of the frequency of the voltage of the source of alternating current and a current that measures the position of the field winding with reference to the rotating flux produced in the stator by the source of alternating current so that the electronic discharge device breaks down only at an instant when the field winding holds a given position with reference to said rotating flux, and means responsive to the breakdown of said electronic discharge device for operating said field circuit switching means.

JOHN W. DAWSON.
WILLIAM R. WICKERHAM.